(12) United States Patent
Ho

(10) Patent No.: US 9,977,313 B2
(45) Date of Patent: May 22, 2018

(54) LENS ADAPTER AND ITS BACK-LOCKING LENS FIXING DEVICE

(71) Applicant: GLOBAL BOOM INTERNATIONAL LIMITED, Kowloon (HK)

(72) Inventor: Peter Chung Man Ho, Kowloon (HK)

(73) Assignee: GLOBAL BOOM INTERNATIONAL LIMITED, Kowloon (HK)

(*) Notice: Subject to any disclaimer, the term of this patent is extended or adjusted under 35 U.S.C. 154(b) by 0 days. days.

(21) Appl. No.: 15/230,033

(22) Filed: Aug. 5, 2016

(65) Prior Publication Data

US 2018/0039165 A1    Feb. 8, 2018

(51) Int. Cl.
  G03B 17/14  (2006.01)
  G03B 17/56  (2006.01)
  G02B 7/14   (2006.01)
  G02B 7/02   (2006.01)

(52) U.S. Cl.
  CPC .......... *G03B 17/566* (2013.01); *G02B 7/022* (2013.01); *G02B 7/14* (2013.01); *G03B 17/14* (2013.01)

(58) Field of Classification Search
  None
  See application file for complete search history.

(56) References Cited

U.S. PATENT DOCUMENTS

| | | | | |
|---|---|---|---|---|
| 4,063,264 A * | 12/1977 | Ando | ............. | G03B 17/14 359/828 |
| 2006/0165401 A1* | 7/2006 | Doi | ............. | G03B 17/14 396/71 |
| 2013/0100344 A1* | 4/2013 | Kikuchi | ............. | G03B 17/566 348/375 |
| 2013/0265662 A1* | 10/2013 | Araie | ............. | G02B 7/02 359/827 |
| 2015/0016814 A1* | 1/2015 | Kuroiwa | ............. | G02B 7/14 396/530 |
| 2015/0212395 A1* | 7/2015 | Kuroda | ............. | H04N 5/2252 396/530 |

* cited by examiner

*Primary Examiner* — William B Perkey
(74) *Attorney, Agent, or Firm* — Intellectual Property Law Group LLP

(57) ABSTRACT

A lens adapter and its back-locking lens fixing device are provided here. The lens fixing device comprises a connecting base (3) which has a receiving hole (31) for receiving the connecting end of the tube body (1) axially opened on it; the lens fixing device further comprises a limiting portion (4) mounted on the connecting base (3), which comprises a rotational portion (41) rotatably sleeved outside of the connecting base (3) and three second male pawl portions (42) those are connected with the rotational portion (41) and extend into the receiving hole (31) through a sidewall of the connecting base (3). The design lens adapter and its back-locking lens fixing device are clever and practical.

16 Claims, 4 Drawing Sheets

LENS ADAPTER AND ITS BACK-LOCKING LENS FIXING DEVICE

BACKGROUND OF INVENTION

1. Field of Invention

The present application relates to the field of camera, and more particularly relates to a lens adapter and its back-locking lens fixing device.

2. Background

A bayonet is often employed to fix the EF lens in the lens adapter which is used to mount the EF lens to the E-type camera in the prior art. Because of the need of shooting, the lens adapter is used for fixing various models and types of lenses, which will increase the frequency of locking/loosening the bayonet. With the increasing frequency of the use, the bayonet will be continually worn by using. After the bayonet has been worn for many years, a gap will be produced between the lens and the lens adapter, which will affect the shooting.

SUMMARY OF INVENTION

The objective of the present application is to provide a lens adapter and its back-locking lens fixing device, aiming at the above-mentioned drawback of the bayonet that is employed to fix the lens in the lens adapter being continually worn with the increasing frequency of using.

The technical solutions of the present application for solving the technical problems are as follows:

a lens fixing device configured for fixing a lens, the lens comprises a tube body and three first male pawl portions respectively arranged on an outer sidewall of a connecting end of the tube body, wherein, the lens fixing device comprises a connecting base which has a receiving hole for receiving the connecting end of the tube body axially opened on it;

the lens fixing device further comprises a limiting portion mounted on the connecting base, which comprises a rotational portion rotatably sleeved outside of the connecting base and three second male pawl portions those are connected with the rotational portion and extend into the receiving hole through a sidewall of the connecting base; and when the connecting end of the tube body is received in the receiving hole, the three second male pawl portions is configured to rotate with respect to the rotational portion to lock the three first male pawl portions into the receiving hole respectively.

In the lens fixing device of the present application, a limiting hole is opened on the tube body, and the lens fixing device further comprises a limiting column that is arranged on top of the connecting base and is configured to be embedded into the limiting hole when the connecting end of the tube body is received in the receiving hole.

In the lens fixing device of the present application, the three first male pawl portions are arranged on the connecting end of the tube body at intervals and equally divide a circle of the connecting end of the tube body; the rotational portion is in shape of a ring, and the three second male pawl portions are arranged on an inside wall of the rotational portion at intervals and equally divide a circle of the inside wall of the rotational portion.

In the lens fixing device of the present application, a receiving groove is circumferentially opened on the outer sidewall of the connecting end of the tube body, and thus a first limiting flange is formed on one end of the receiving groove of the tube body; three notches respectively connected with the receiving groove are opened on the first limiting flange to form the three first male pawl portion on the first limiting flange.

In the lens fixing device of the present application, a second limiting flange in a ring shape is defined on an inside wall of the connecting base to limit the first male pawl portion, and when the second male pawl portion slides into the receiving groove, the first male pawl portion penetrates the second limiting flange.

A lens adapter comprising a lens fixing device according to above is also provided here.

In summary, when implementing the lens adapter and its back-locking lens fixing device of the present application, the following advantageous effects can be achieved: by the rotation of the three second male pawl portions, the three second male pawl portions are limited and locked in the receiving hole, thus avoiding the use of the bayonet and extending the service life of the lens adapter; the design is clever and practical.

BRIEF DESCRIPTION OF THE DRAWINGS

The present application will be further described with reference to the accompanying drawings and embodiments in the following, in the accompanying drawings.

DETAILED DESCRIPTION OF SPECIFIC EMBODIMENTS

The present application aims to solve the following problem: a bayonet is often employed to fix the lens in the lens adapter; with the increasing frequency of the use, the bayonet will be continually worn by using; after the bayonet has been worn for many years, a gap will be produced between the lens and the lens adapter, which will affect the shooting. The technical solutions of the present application for solving the technical problems are as follows: a back-locking lens fixing device is provided on the lens adapter lens to lock the lens by the lens fixing device after the lens is connected with the lens adapter. The present application avoids using the bayonet to fix the lens and extends the service life of the lens adapter.

To make the technical feature, objective and effect of the present application be understood more clearly, now the specific implementation of the present application is described in detail with reference to the accompanying drawings and embodiments. It should be understood that the specific embodiments described herein are only used to explain the present application and are not intended to limit the present application.

Figure 1:
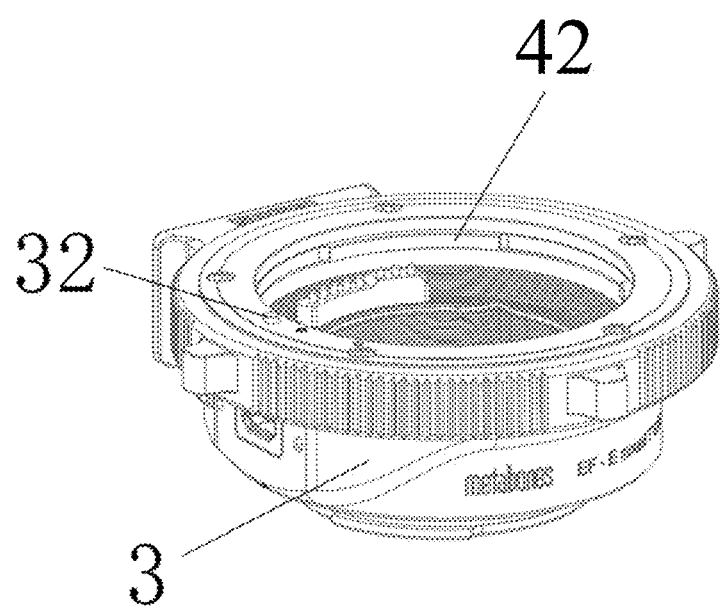
FIG. 1 is a schematic diagram of a lens adapter, according to a first preferred embodiment of the present application.
Figure 2:
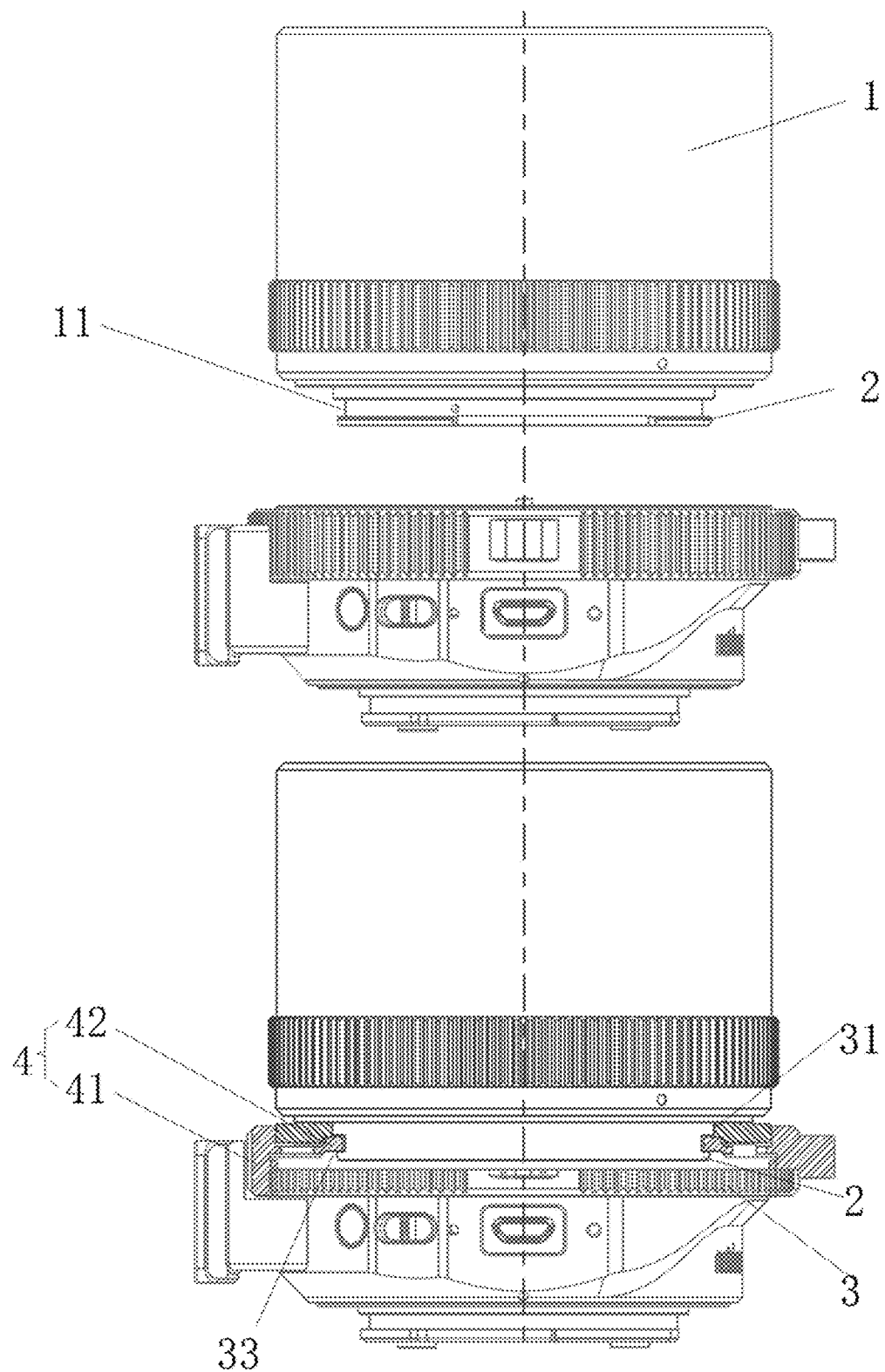
FIG. 2 is a schematic diagram of a connection between a lens and the lens adapter shown in FIG. 1.

The first embodiment:

As shown in FIG. 1 and FIG. 2, FIG. 1 is a schematic diagram of a lens adapter, according to a first preferred embodiment of the present application; FIG. 2 is a schematic diagram of a connection between a lens and the lens adapter shown in FIG. 1.

As shown in FIG. 2, the lens comprises a tube body 1 and three first male pawl portions 2 respectively arranged on an outer sidewall of a connecting end of the tube body 1, wherein, the connecting end of the tube body 1 refers to the end of the tube body 1 that is connected with the lens adapter. As shown in FIG. 1 and FIG. 2, the lens adapter comprises a lens fixing device. The lens fixing device comprises a connecting base 3 which has a receiving hole 31 for receiving the connecting end of the tube body 1 axially opened on it. The lens fixing device further comprises a limiting portion 4 mounted on the connecting base 3, which comprises a rotational portion 41 rotatably sleeved outside of the connecting base 3 and three second male pawl portions 42 those are connected with the rotational portion 41 and extend into the receiving hole 31 through a sidewall of the connecting base 3. When the connecting end of the tube body 1 is received in the receiving hole 31, the three second male pawl portions 42 is configured to rotate with respect to the rotational portion 41 to lock the three first male pawl portions 2 into the receiving hole 31 respectively. The present application employs the limiting portion 4 to strictly limit the translational degrees of freedom of the lens in the axial.

A limiting hole (not shown) is opened on the tube body 1. As shown in FIG. 1, the lens fixing device further comprises a limiting column 32 that is arranged on top of the connecting base 3. The limiting column 32 is configured to be embedded into the limiting hole when the connecting end of the tube body 1 is received in the receiving hole 31, so that the rotational degrees of freedom of the lens with respect to the connecting base 3 is strictly limited. When the connecting end of the lens tube body 1 is received in the receiving hole 31, as the translational degrees of freedom of the lens in the axial and the rotational degrees of freedom of the lens with respect to the connecting base 3 are strictly limited, the lens and the lens adapter are completely fixed together.

Specifically, in this embodiment, as shown in FIG. 1 and FIG. 2, the three first male pawl portions 2 are arranged on the connecting end of the tube body 1 at intervals and equally divide a circle of the connecting end of the tube body 1. The rotational portion 41 is in shape of a ring. The three second male pawl portions 42 are arranged on an inside wall of the rotational portion 41 at intervals and equally divide a circle of the inside wall of the rotational portion 41. When the connecting end of the tube body 1 penetrates the receiving hole 31, the three first male pawl portions 2 pass through the gap of the three second male pawl portions 42 respectively, so that the three second male pawl portions 42 are arranged between the three first male pawl portions 2 and the tube body 1 respectively.

Further, in this embodiment, as shown in FIG. 2, a receiving groove 11 is circumferentially opened on the outer sidewall of the connecting end of the tube body 1, and thus a first limiting flange is formed on one end of the receiving groove 11 of the tube body 1. Three notches respectively connected with the receiving groove 11 are opened on the first limiting flange to form the three first male pawl portions 2 on the first limiting flange. When the connecting end of the tube body 1 penetrates the receiving hole 31, the three first male pawl portions 2 pass through the gap of the three second male pawl portions 42 respectively, and the three second male pawl portions 42 slide into the receiving groove 11. The width of the receiving groove 11 is slightly larger than the thickness of the second male pawl portions 42, so that the sidewall of the receiving groove 11 opposing the first male pawl portion 2 can support the second male pawl portions 42. Thus the second male pawl portions 42 are avoided from being broken because of the shearing action when the lens is accidentally hit.

Further, in this embodiment, as shown in FIG. 2, a second limiting flange 33 in a ring shape is defined on an inside wall of the connecting base 3 to limit the first male pawl portion 2. The diameter of the inner wall of the second limiting flange 33 is slightly larger than the diameter of the first male pawl portion 2. When the second male pawl portions 42 slide into the receiving groove 11, the first male pawl portion 2 penetrates the second limiting flange 33. By doing this, the first male pawl portion 2 is limited by the second limiting flange 33.

The second embodiment:

The difference between the second embodiment and the first embodiment is the shape of the connecting end of the lens tube body 1.

Figure 3:
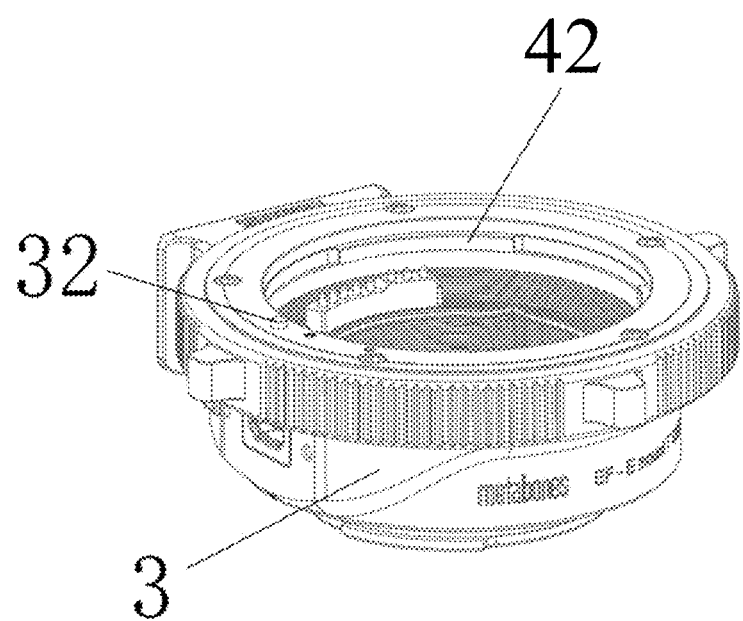
FIG. 3 is a schematic diagram of a lens adapter, according to a second preferred embodiment of the present application.
Figure 4:
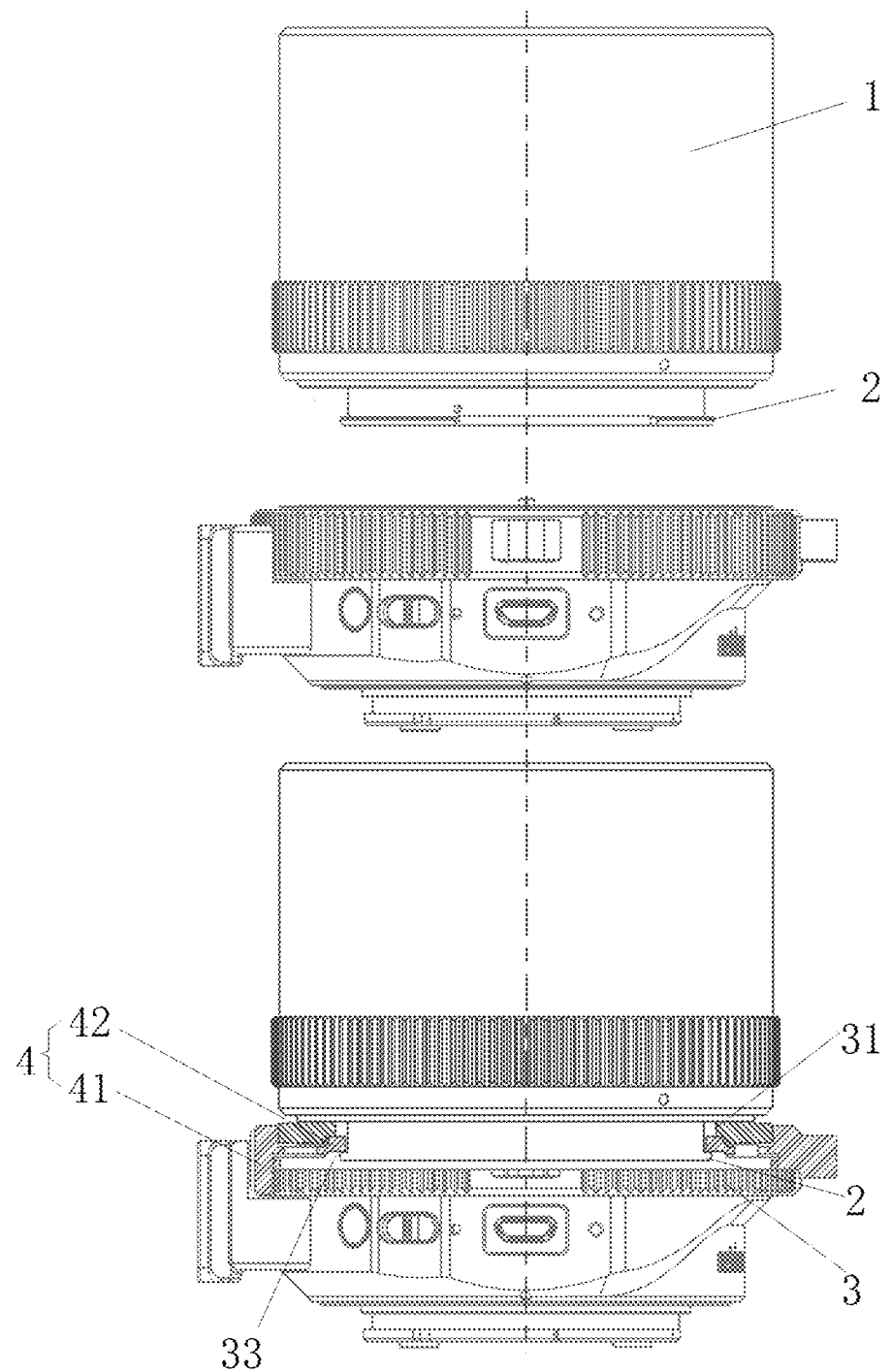
FIG. 4 is a schematic diagram of a connection between a lens and the lens adapter shown in FIG. 3.

As shown in FIG. 3 and FIG. 4, FIG. 3 is a schematic diagram of a lens adapter, according to a second preferred embodiment of the present application; FIG. 4 is a schematic diagram of a connection between a lens and the lens adapter shown in FIG. 3.

As shown in FIG. 4, the lens comprises a tube body 1 and three first male pawl portions 2 respectively arranged on an outer sidewall of a connecting end of the tube body 1, wherein, the connecting end of the tube body 1 refers to the end of the tube body 1 that is connected with the lens adapter. As shown in FIG. 3 and FIG. 4, the lens adapter comprises a lens fixing device. The lens fixing device comprises a connecting base 3 which has a receiving hole 31 for receiving the connecting end of the tube body 1 axially opened on it. The lens fixing device further comprises a limiting portion 4 mounted on the connecting base 3, which comprises a rotational portion 41 rotatably sleeved outside of the connecting base 3 and three second male pawl portions 42 those are connected with the rotational portion 41 and extend into the receiving hole 31 through a sidewall of the connecting base 3. When the connecting end of the tube body 1 is received in the receiving hole 31, the three second male pawl portions 42 is configured to rotate with respect to the rotational portion 41 to lock the three first male pawl portions 2 into the receiving hole 31 respectively. The present application employs the limiting portion 4 to strictly limit the translational degrees of freedom of the lens in the axial. Preferably, in this embodiment, the lens fixing device further comprises a restricting portion that is arranged on the connecting base 3 and is configured to restrict the rotation of the limiting portion 4 with respect to the connecting base 3.

A limiting hole (not shown) is opened on the tube body 1. As shown in FIG. 3, the lens fixing device further comprises a limiting column 32 that is arranged on top of the connecting base 3. The limiting column 32 is configured to be embedded into the limiting hole when the connecting end of the tube body 1 is received in the receiving hole 31, so that the rotational degrees of freedom of the lens with respect to the connecting base 3 is strictly limited. When the connecting end of the lens tube body 1 is received in the receiving hole 31, as the translational degrees of freedom of the lens in the axial and the rotational degrees of freedom of the lens with respect to the connecting base 3 are strictly limited, the lens and the lens adapter are completely fixed together.

Specifically, in this embodiment, as shown in FIG. 3 and FIG. 4, the three first male pawl portions 2 are arranged on the connecting end of the tube body 1 at intervals and equally divide a circle of the connecting end of the tube body 1. The rotational portion 41 is in shape of a ring. The three second male pawl portions 42 are arranged on an inside wall of the rotational portion 41 at intervals and equally divide a circle of the inside wall of the rotational portion 41. When the connecting end of the tube body 1 penetrates the receiving hole 31, the three first male pawl portions 2 pass through the gap of the three second male pawl portions 42 respectively, so that the three second male pawl portions 42 are arranged between the three first male pawl portions 2 and the tube body 1 respectively.

Further, in this embodiment, as shown in FIG. 4, the three first male pawl portions 2 respectively protrude from the outer sidewall of the connecting end of the tube body 1, which is different from the first embodiment. Therefore, when employing the technical solution of the present embodiment, it is necessary to prevent the lens from accidental impact.

Further, in this embodiment, as shown in FIG. 4, a second limiting flange 33 in a ring shape is defined on an inside wall of the connecting base 3 to limit the first male pawl portion 2. The diameter of the inner wall of the second limiting flange 33 is slightly larger than the diameter of the first male pawl portion 2. By doing this, the second limiting flange 33 is configured to limit the first male pawl portion 2 when the first male pawl portion 2 penetrates the second limiting flange 33.

A lens adapter comprising the above lens fixing device is also presented in the present application.

when implementing the lens adapter and its back-locking lens fixing device of the present application, the following advantageous effects can be achieved: by the rotation of the three second male pawl portions, the three second male pawl portions are limited and locked in the receiving hole, thus avoiding the use of the bayonet and extending the service life of the lens adapter; the design is clever and practical.

While the embodiments of the present application are described with reference to the accompanying drawings above, the present application is not limited to the above-mentioned specific implementations. In fact, the above-mentioned specific implementations are intended to be exemplary not to be limiting. In the inspiration of the present application, those ordinary skills in the art can also make many modifications without breaking away from the subject of the present application and the protection scope of the claims. All these modifications belong to the protection of the present application.

What is claimed is:

1. A lens fixing device configured for fixing a lens, the lens comprises a tube body (1) and three first male pawl portions (2) respectively arranged on an outer sidewall of a connecting end of the tube body (1), the three first male pawl portions integral to the outer sidewall and extend radially beginning from an outermost perimeter of the outer sidewall, formed by three notches on a first limiting flange at the connecting end of the tube body, wherein, the lens fixing device comprises a connecting base (3) which has a receiving hole (31) for receiving the connecting end of the tube body (1) axially disposed on it, and an end of the connecting base opposite the receiving hole is removably mountable to a camera body;

the lens fixing device further comprises a limiting portion (4) mounted on the connecting base (3), which comprises a rotational portion (41) rotatably sleeved outside of the connecting base (3) and three second male pawl portions (42) which are connected with the rotational portion (41) and extend into the receiving hole (31) through a sidewall of the connecting base (3), each of the three second male pawl portions extend radially with a uniform thickness into the receiving hole; and when the connecting end of the tube body (1) is received in the receiving hole (31), the three second male pawl portions (42) are configured to rotate with respect to the rotational portion (41) to lock the three first male pawl portions (2) into the receiving hole (31) respectively.

2. The lens fixing device according to claim 1, wherein, a limiting hole is disposed on the tube body (1), and the lens fixing device further comprises a limiting column (32) that is arranged on top of the connecting base (3) and is configured to be embedded into the limiting hole when the connecting end of the tube body (1) is received in the receiving hole (31).

3. The lens fixing device according to claim 1, wherein, the three first male pawl portions (2) are arranged on the connecting end of the tube body (1) at intervals and equally divide a circle of the connecting end of the tube body (1); the rotational portion is in shape of a ring, and the three second male pawl portions (42) are arranged on an inside wall of the rotational portion (41) at intervals and equally divide a circle of the inside wall of the rotational portion (41).

4. The lens fixing device according to claim 2, wherein, the three first male pawl portions (2) are arranged on the connecting end of the tube body (1) at intervals and equally divide a circle of the connecting end of the tube body (1); the rotational portion is in shape of a ring, and the three second male pawl portions (42) are arranged on an inside wall of the rotational portion (41) at intervals and equally divide a circle of the inside wall of the rotational portion (41).

5. The lens fixing device according to claim 1, wherein, a receiving groove (11) is circumferentially disposed on the outer sidewall of the connecting end of the tube body (1), and thus the first limiting flange is formed on one end of the receiving groove (11) of the tube body (1); the three notches respectively connected with the receiving groove (11) are disposed on the first limiting flange to form the three first male pawl portion (2) on the first limiting flange.

6. The lens fixing device according to claim 2, wherein, a receiving groove (11) is circumferentially disposed on the outer sidewall of the connecting end of the tube body (1), and thus the first limiting flange is formed on one end of the receiving groove (11) of the tube body (1); the three notches respectively connected with the receiving groove (11) are disposed on the first limiting flange to form the three first male pawl portion (2) on the first limiting flange.

7. The lens fixing device according to claim 5, wherein, a second limiting flange (33) in a ring shape is defined on an inside wall of the connecting base (3) to limit the first male pawl portion (2), and when the second male pawl portion (42) slides into the receiving groove (11), the first male pawl portion (2) penetrates the second limiting flange (33).

8. The lens fixing device according to claim 6, wherein, a second limiting flange (33) in a ring shape is defined on an inside wall of the connecting base (3) to limit the first male pawl portion (2), and when the second male pawl portion (42) slides into the receiving groove (11), the first male pawl portion (2) penetrates the second limiting flange (33).

9. A lens adapter removably mountable to a camera body, comprising a lens fixing device configured for fixing a lens, the lens comprises a tube body (1) and three first male pawl portions (2) respectively arranged on an outer sidewall of a connecting end of the tube body (1), the three first male pawl portions integral to the outer sidewall and extend radially beginning from an outermost perimeter of the outer sidewall, formed by three notches on a first limiting flange at the connecting end of the tube body, wherein, the lens fixing device comprises a connecting base (3) which has a receiving hole (31) for receiving the connecting end of the tube body (1) axially disposed on it, and an end of the connecting base opposite the receiving hole is removably mountable to the camera body;

the lens fixing device further comprises a limiting portion (4) mounted on the connecting base (3), which comprises a rotational portion (41) rotatably sleeved outside of the connecting base (3) and three second male pawl portions (42) which are connected with the rotational portion (41) and extend into the receiving hole (31) through a sidewall of the connecting base (3), each of the three second male pawl portions extend radially with a uniform thickness into the receiving hole; and when the connecting end of the tube body (1) is received in the receiving hole (31), the three second male pawl portions (42) are configured to rotate with respect to the rotational portion (41) to lock the three first male pawl portions (2) into the receiving hole (31) respectively.

10. The lens adapter according to claim 9, wherein, a limiting hole is disposed on the tube body (1), and the lens fixing device further comprises a limiting column (32) that is arranged on top of the connecting base (3) and is configured to be embedded into the limiting hole when the connecting end of the tube body (1) is received in the receiving hole (31).

11. The lens adapter according to claim 9, wherein, the three first male pawl portions (2) are arranged on the connecting end of the tube body (1) at intervals and equally divide a circle of the connecting end of the tube body (1); the rotational portion is in shape of a ring, and the three second male pawl portions (42) are arranged on an inside wall of the rotational portion (41) at intervals and equally divide a circle of the inside wall of the rotational portion (41).

12. The lens adapter according to claim 10, wherein, the three first male pawl portions (2) are arranged on the connecting end of the tube body (1) at intervals and equally divide a circle of the connecting end of the tube body (1); the rotational portion is in shape of a ring, and the three second male pawl portions (42) are arranged on an inside wall of the rotational portion (41) at intervals and equally divide a circle of the inside wall of the rotational portion (41).

13. The lens adapter according to claim 9, wherein, a receiving groove (11) is circumferentially disposed on the outer sidewall of the connecting end of the tube body (1), and thus the first limiting flange is formed on one end of the receiving groove (11) of the tube body (1); the three notches respectively connected with the receiving groove (11) are disposed on the first limiting flange to form the three first male pawl portion (2) on the first limiting flange.

14. The lens adapter according to claim 10, wherein, a receiving groove (11) is circumferentially disposed on the outer sidewall of the connecting end of the tube body (1), and thus the first limiting flange is formed on one end of the receiving groove (11) of the tube body (1); the three notches respectively connected with the receiving groove (11) are disposed on the first limiting flange to form the three first male pawl portion (2) on the first limiting flange.

15. The lens adapter according to claim 13, wherein, a second limiting flange (33) in a ring shape is defined on an inside wall of the connecting base (3) to limit the first male pawl portion (2), and when the second male pawl portion (42) slides into the receiving groove (11), the first male pawl portion (2) penetrates the second limiting flange (33).

16. The lens adapter according to claim 14, wherein, a second limiting flange (33) in a ring shape is defined on an inside wall of the connecting base (3) to limit the first male pawl portion (2), and when the second male pawl portion (42) slides into the receiving groove (11), the first male pawl portion (2) penetrates the second limiting flange (33).

* * * * *